United States Patent [19]
Lin et al.

[11] Patent Number: 5,615,267
[45] Date of Patent: Mar. 25, 1997

[54] METHOD FOR ADAPTIVELY SWITCHING BETWEEN PCS AUTHENTICATION SCHEMES

[75] Inventors: Jason Y. Lin, Hsinchu, Taiwan; Seshadri Mohan, Basking Ridge, N.J.; Howard Sherry, Freehold, N.J.; Nelson R. Sollenberger, Tinton Falls, N.J.

[73] Assignee: Bell Communications Research, Inc., Morristown, N.J.

[21] Appl. No.: 503,398

[22] Filed: Jul. 17, 1995

[51] Int. Cl.$^6$ ....................................................... H04L 9/00
[52] U.S. Cl. ................... 380/23; 380/49; 375/200; 379/58; 379/59; 455/33.1; 455/53.1; 455/54.1
[58] Field of Search ................. 380/23, 49; 340/825.31, 340/825.34; 375/200–210; 379/58, 59; 455/33.1, 53.1, 54.1

[56] References Cited

U.S. PATENT DOCUMENTS 5,163,097  11/1992  Pegg ........................................ 380/23 X

OTHER PUBLICATIONS

S. Mohan, "Network Impacts of Privacy and Authentication Protocols for PCS", 1995 IEEE International Conference on Communications, Jun. 18–22, 1995, pp. 1557–1561.

EIA/TIA Cellular Radio Telecommunications Intersystem Operations: Authentication, Signaling Message Encryption, and Voice Privacy, Technical Report, TSB–51, EIA/TIA 1993.

*Primary Examiner*—Bernarr E. Gregory
*Attorney, Agent, or Firm*—Joseph Giordano; James W. Falk

[57] ABSTRACT

A method for adaptively switching between the WS and S authentication schemes is based on the customer's usage. A first preferred embodiment provides a 2n–1 state automaton (where n>1), which switches from the WS Scheme to the S Scheme when the automaton passes from state n–1 to state n, and vice versa. At each new registration, the automaton increases one state if more than 1 call was made (i.e., incoming or outgoing) during the cycle; decreases one state if no calls were made during the cycle; and remains the same if 1 call was made during the cycle. The value of n is preferably determined by the PSP based on customer usage. A second preferred embodiment begins each new cycle with the WS Scheme, and will switch to the S Scheme if a call is made during the registration.

17 Claims, 4 Drawing Sheets

METHOD FOR ADAPTIVELY SWITCHING BETWEEN PCS AUTHENTICATION SCHEMES

FIELD OF THE INVENTION

The present invention is directed to an improved method for selecting personal communication system authentication schemes and, more particularly, to a method for improving PCS network authentication signal flow by adaptively selecting between two authentication schemes used in the cellular communication industry Interim Standard IS 41 Revision C.

BACKGROUND OF THE INVENTION

Mobile communications networks, such as cellular telephone and/or personal communication systems (PCS) networks allow customers to travel, yet remain connected to the network. FIG. 1 illustrates a portion 10 of such a network. A customer having a cellular telephone or personal communications device (referred to collectively as "handset" 12) is connected to a wireless communication network 14 provided by a cellular or personal communication service provider (collectively referred to as PSP). As the customer travels, he may enter a number of Registration Areas (RAs) such as $RA_1$ 16, $RA_2$ 18, which are different geographical areas serviced by the same or different PSPs. The PCS service area within the PSP 14 may be populated with base stations 20 for providing wireless access to the handset, and mobile switching centers (MSC) 22 that control the base stations.

According to the standard commonly used in North America, the customer may have personal information, such as a telephone or personal communications number, account information, credit and billing information, and the like stored in a PSP 14 network database servicing the customer's home area. This database is known as the Home Location Register (HLR) 24. As the customer travels to different RAs, i.e., the handset 12 crosses dashed line 26 in FIG. 1 to exit $RA_1$ 16 and to enter $RA_2$ 18, (the handset in phantom is in the geographical area serviced by $RA_2$) the customer is automatically registered at the new area's local PSP 14 network database. Typically, a subset of the information stored at the HLR 24 is stored at this remote database. This remote database is referred to as a Visitors Location Register (VLR) 28. The network may also store personal information about the customer which identifies the customer as an authorized user of the network. This authentication information is typically stored in a database referred to as an Authentication Center (AC) 30. A customer is "authenticated" to identify the user and insure that the user is authorized to receive the mobile service.

The Electronic Industry Association/Telecommunications Industry Association (EIA/TIA) has proposed a revised system for cellular communications known as Interim Standard IS 41 Revision C. This standard has defined protocols for authentication, voice privacy, and signal message privacy, and includes two different user authentication algorithms. The algorithms for authentication and voice and signaling privacy are based on encryption techniques which use shared secret data (SSD) shared between the customer's handset 12 and the AC 30, which maintains the SSDs for each network customer. One of the authentication algorithms, referred to as the WS Scheme, makes the most efficient use of authentication signal traffic on the cellular network when the customer changes RAs i.e., 16, 18 more frequently than makes or receives calls. This relationship between registrations and calls is referred to as the call-to-mobility ratio (CMR). The second algorithm, referred to as the S Scheme, makes efficient use of authentication signal traffic where the customer makes or receives more calls than registers into new RAs (i.e., the CMR>1).

The WS scheme shares the SSD between the handset 12 and the AC 30 only. In the S Scheme, the SSD is also shared with the VLR 28, as well. Only the VLR 28 and handset 12 are involved in call authentication. Thus, the cost is "cheaper" then the WS scheme, where the HLR 24 and AC 30 are involved in the authentication. However, registration requires additional message flow beyond the WS Scheme's requirements. Thus, there is a tradeoff between the two schemes depending on the customer's CMR. Neither authentication scheme will provide the most efficient use of network resources for all of a PSP's customers nor, in many instances, even for a single customer.

1. The WS Scheme

In the WS Scheme, the SSD is shared between the handset 12 and the AC 30. Each handset has a Mobile Identification Number (MIN), which is stored in the handset during manufacture and cannot be changed. Also associated with the handset 12 is a unique Electronic Serial Number (ESN). FIG. 2 illustrates the message flow 50 between the PSP, VLR, HLR, and AC during WS Scheme registration.

When a customer enters into a new RA, the handset receives a signal emitted from the local base station informing it that it has entered into a new RA and authentication is required. The handset executes a Cellular Authentication and Voice Encryption (CAVE) algorithm, using the SSD, ESN, and MIN stored in the handset, and a random number (RAND) which the handset obtains from the PSP. The result of this algorithm is a registration authentication result (AUTHR). The handset then requests the MSC 22 for registration at the new RA. This is done by supplying AUTHR, ESN, MIN, the eight most significant bits of RAND (RANDC), and an account of significant events initiated by the handset, such as registration history, call originations, and call terminations. This account is known as COUNT. COUNT is also maintained by the AC. The MSC forwards the authentication request in a message AUTHRQST to the VLR servicing the new RA (line 52). The VLR forwards the AUTHRQST to the HLR with the parameters it has received (line 54). The HLR forwards the AUTHRQST to the AC (line 56).

When the AC receives the AUTHRQST, it retrieves the SSD associated with the MIN, and performs the CAVE algorithm using the MIN, ESN, and RAND received from the HLR. The authentication result of the CAVE algorithm is compared to the AUTHR generated by the handset. The COUNT stored in the AC is also compared to the COUNT received from the handset. If the comparisons are favorable, the AC provides an authentication response authrqst, which is sent to the HLR (line 58), VLR (line 60), and MSC (line 62). When the MSC notifies that the registration is authorized, the MCS issues a registration notification message.

FIG. 3 illustrates the message flow 100 when a handset registered at a new RA originates a call. When the customer wishes to place a call, the handset executes the CAVE algorithm using the same parameters as above and the digits dialed by the customer. This results in the AUTHR signal, a voice privacy mask VPMASK, and a signal message encryption key SMEKEY. These three signals are forwarded to the serving PSP system. The PSP sends the AUTHRQST to the VLR (line 102), which forwards the signal to the HLR (line 104), which forwards the signal to the AC (line 106). The AC verifies the AUTHR and COUNT values and generates VPMASK and SMEKEY. The response authrqst is sent to the HLR (line 108), VLR (line 110), and the PSP (line 112). When the handset is authenticated, the serving PSP initiates an IS 41 location request message LOCREQ to determine the called party's current location.

When the customer's handset is the location of a call termination (i.e., the customer is receiving a call on the handset), the message flow is similar to the flow described in FIG. 3. The serving PSP pages the called handset. In response, the handset executes the CAVE algorithm using AUTHR, COUNT, ESN, MIN, and RANDC. The message flow is the same as shown in FIG. 3. When the called handset is authenticated, a voice channel is established between the handset and the calling party.

2. The S Scheme

In the S Scheme, the SSD is shared with the VLR 28. Thus, handset registration during authentication requires more steps than registration under the WS Scheme. This is because the COUNT value is stored in the previous RA's VLR 28. In order for the AC 30 to authenticate the handset, it must request the COUNT from the previous RA's VLR 28. Once the handset is registered in the new VLR 28, all other transactions such as call origination and call termination, may be authenticated by the VLR 28. Access to the AC 30 is not needed again until the handset enters a new RA and registration is required.

FIG. 4 illustrates the message flow 150 between the MSC, the previous RA's VLR (the "Old VLR"), the new RA's VLR ("VLR"), HLR, and AC during S Scheme registration. When the handset determines that it has entered a new RA, registration is required and the handset must be authenticated to access PSP services. The handset executes the CAVE algorithm using the SSD, ESN, and MIN associated with the handset, and RAND obtained from the PSP at that time. The algorithm results in a registration authentication result AUTHR. The handset then requests the MSC 22 for registration at the new RA. This is done by supplying AUTHR, ESN, MIN, RANDC, and COUNT. Unlike the WS Scheme, in the S Scheme, the COUNT is not maintained by the AC. The AUTHRQST is sent from the MSC to the VLR (line 152), the HLR (line 154), and the AC (line 156). The AC cannot verify the handset without COUNT. Therefore, the AC issues a COUNTREQ message, requesting the COUNT. This COUNTREQ is sent to the HLR (line 158) and then to the Old VLR (line 160). The Old VLR responds by sending the COUNT in a countreq message to the HLR (line 162) which is directed to the AC (line 164). The AC may now verify the handset and, if verified, the AC issues a response authreq to the AUTHRQST which is sent to HLR (line 166), VLR (line 168), and the PSP (line 170).

FIG. 5 illustrates the message flow 200 when a handset registered at a new RA under the S Scheme originates or terminates a call. When the customer places or receives a call, the handset executes the CAVE algorithm using the same parameters as above and the digits dialed by the customer. This results in the AUTHR signal, VPMASK, and SMEKEY. These three parameters and the dialed digits are forwarded to the serving PSP system. The PSP sends the AUTHREQ to the VLR (line 202). The VLR, which stores the COUNT value, performs the CAVE algorithm and generates AUTHR, VPMASK, and SMEKEY. If AUTHR and COUNT verify, these results are sent in an authreq message with VPMASK and SMEKEY to the PSP (line 204).

As used in this patent application a "cycle" means the time period between two consecutive registrations for a customer. The "cost of a cycle" as used in this patent application means the number of messages sent to access a database (AC/HLR/VLR) during a cycle. The messages for a registration are included in the cost of the cycle in which the customer is being registered (e.g., the new cycle).

As seen in FIGS. 2 and 3, in the WS Scheme, 5 database accesses are needed to authenticate a registration and 5 database accesses are needed to authenticate each call origination or termination. Thus, a customer's total expected cost per cycle of the WS Scheme is $5+5i$, where i is the number of calls originated or terminated during the cycle.

As seen in FIGS. 4 and 5, in the S Scheme, 9 database accesses are needed to authenticate a registration and 1 database access is needed to authenticate each call origination or termination. Thus, a customer's total expected cost per cycle of the S Scheme is $9+1i$. Please note that the two schemes cost the same when i=1. The WS Scheme is more cost effective when the CMR<1; the S Scheme is more cost effective when the CMR>1.

Because neither authentication scheme provides the most efficient use of authentication signals for all of a PSP's customers nor, in many instances, even for a single customer, it is an object of the present invention to provide a method for adaptively switching between the WS and S Schemes, depending on the customer's mobile communications usage.

SUMMARY OF THE INVENTION

This and other objects of the invention are achieved by the present invention. The present invention provides a method for adaptively switching between the WS and S authentication schemes based on the customer's usage.

A first preferred embodiment provides a $2n-1$ state automaton which switches from the WS Scheme to the S Scheme when the automaton passes from state $n-1$ to state n, and vice versa. At each new registration, the automaton transitions to next higher state if more than 1 call was made (e.g., incoming or outgoing) during the previous cycle; transitions to the next lower one state if no calls were made during the cycle; and remains the same if 1 call was made during the cycle. The value of n is preferably determined by the PSP based on customer usage.

A second preferred embodiment begins each new cycle with the WS Scheme, and will switch to the S Scheme if a call is made during the cycle.

BRIEF DESCRIPTION OF THE DRAWINGS

The present invention is described with reference to the following figures.

Attached as Appendix A is a glossary of acronyms used in this specification.

DESCRIPTION OF PREFERRED EMBODIMENTS

An efficient mobile communication or PCS system should reduce the number of database accesses needed to authenticate a registration or call. This reduces the traffic flow on the system. Thus, it is desirable to switch between the WS Scheme and S Scheme when it becomes efficient to do so. The present invention provides two methods for determining when to switch from one scheme to the other. These methods are referred to as Method 1 and Method 2.

A. Method 1

Figure 6:
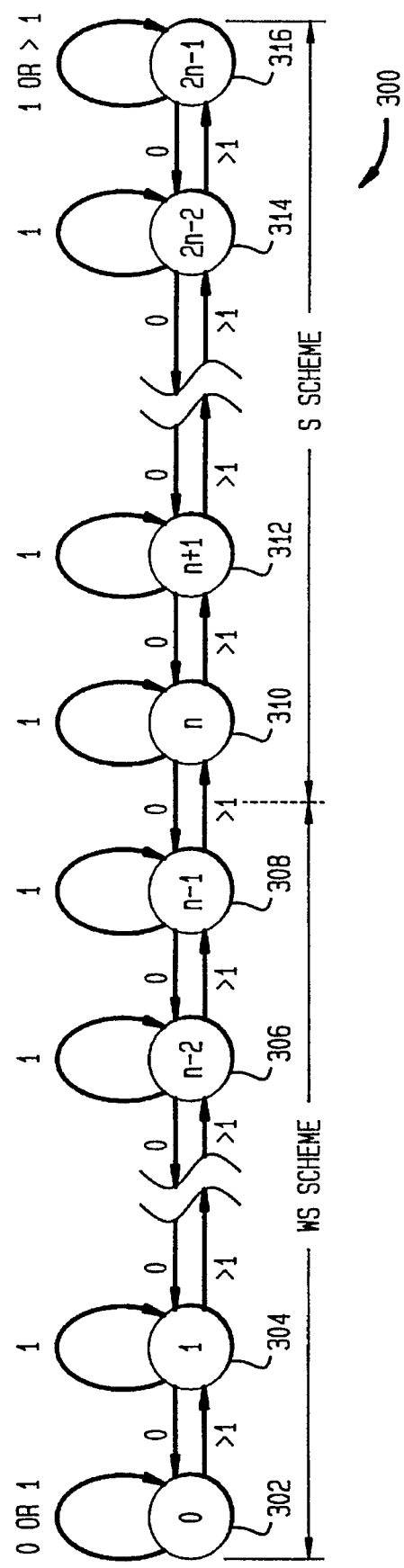
FIG. 6 is a state diagram illustrating the operation of one embodiment of the present invention.

FIG. 6 is a state diagram 300 illustrating the operation of Method 1. Method 1 is a 2n state automaton residing in the AC 30. The automaton has states 0 to 2n−1 (302–316). When the automaton is between the state 0 (302) and state n−1 (308), the WS Scheme is performed. When the automaton is between state n (310) and 2n−1 (316), the S Scheme is performed. The automaton may change states at each registration. At each registration, the COUNT is received by the AC 30 from the handset 12. The automaton will remain in the same state if the number of calls terminated or originated during the registration is 1. The automaton will transition to the next lower state if the number of calls terminated or originated during the registration is 0 except when the automaton is in state 0. In state 0, the automaton will remain in the same state when the number of calls originated or terminated are 0 or 1. The automaton will transition to the next higher state if the number of calls terminated or originated during the registration is greater than 1, except when the automaton is in state 2n−1. In state 2n−1, the automaton will remain in the same state when the number of calls originated or terminated are 1 or more. When the state transitions from state n−1 308 to n 310, the authentication scheme switches from WS to S, when the state transitions from state n 310 to n−1 308, the authentication scheme moves from S to WS. The authentication scheme will remain the same for all other state changes.

The value of n is chosen by the PSP by monitoring its customers' usage. The value of n may vary during different times of the day or on different days. To implement this method, the AC preferably maintains a number of Current State bits to represent the current state. Preferably, the AC stores $\lfloor \log_2 n \rfloor + 1$ Current State bits (i.e., enough bits to indicate the digital value of the state up to 2n). Also, each VLR preferably maintains one Authentication Scheme (AS) bit to represent the proper authentication scheme tier the customer.

Figure 7:
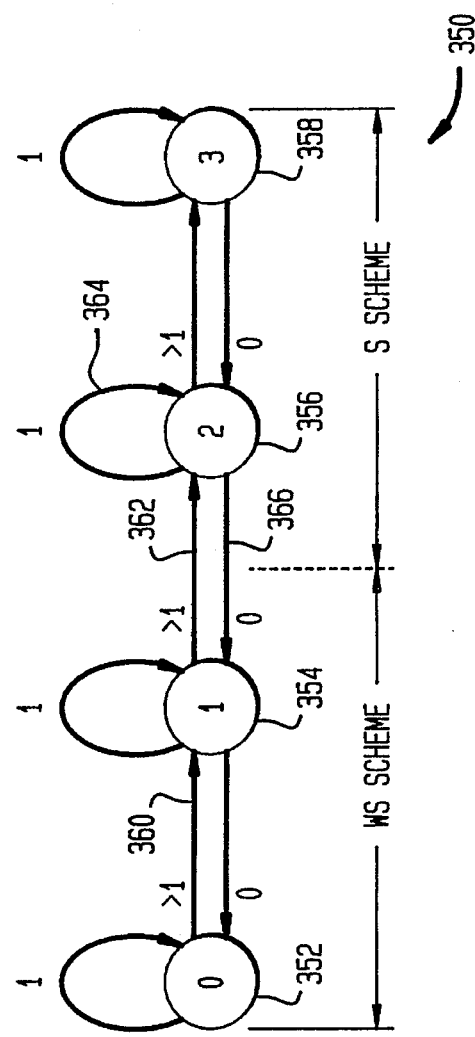
FIG. 7 is a four state diagram illustrating the operation of one embodiment of the present invention.

FIG. 7 illustrates an example of the operation of Method 1. Assume for illustrative purposes that n=2. Thus the automaton's 350 states are 0 (352), 1 (which is n−1) (354), 2 (n) (356), and 3 (which is 2n−1) (358). The operation is:

1. A user registers into a first RA and the automaton is in state 0 (352) and the WS Scheme is executed;
2. The customer makes several calls during the residence time in the first RA;
3. The customer travels to a new RA;
4. The COUNT maintained in the handset is sent to the AC;
5. The AC determines that the number of calls made or received during the previous registration>1;
6. The AC transition the automaton into state 1 (line 360), and the authentication scheme remains unchanged;
7. The customer receives several calls during the residence time in the second RA;
8. The customer travels to a new RA;
9. The COUNT maintained in the handset is sent to the AC;
10. The AC determines that the number of calls made or received during the previous registration>1;
11. The AC transitions the automaton into state 2 (line 362), and the authentication scheme is switched from WS to S;
12. The customer places one call during the residence time in the third RA;
13. The customer travels to a new RA;
14. The COUNT maintained in the handset is sent to the AC;
15. The AC determines that the number of calls made or received during the previous registration=1;
16. The AC does not change the state and the authentication scheme remains S (line 364);
17. The customer does not make or receive a call during the residence time in the fourth RA;
18. The customer travels to a new RA;
19. The COUNT maintained in the handset is sent to the AC;
20. The AC determines that the number of calls made or received during the previous registration=0; and
21. The AC transitions the automaton from state 2 to state 1 (line 366) and the authentication scheme is switched from S to WS.

Preferably, n should be selected to be a relatively low number. The inventors have found that the greater the number of states, more cycles are needed to switch states. An automaton having a relatively large n value will be slower to reflect a change in a customer's CMR than an automaton having a relatively small n value. This is because several consecutive cycles may pass wherein the number of calls originating or terminating from the handset are either 0 or greater than 1, yet the authentication scheme does not switch.

B. Method 2

In the second method, at the beginning of each cycle, the WS Scheme is performed. An authentication scheme (AS) bit in the AC and the VLR indicate that the WS Scheme is being used. When a call originates or is terminated at the handset, the S Scheme is exercised. The AS bits in the AC and VLR are changed to reflect that the S Scheme is now being used.

Figure 1:
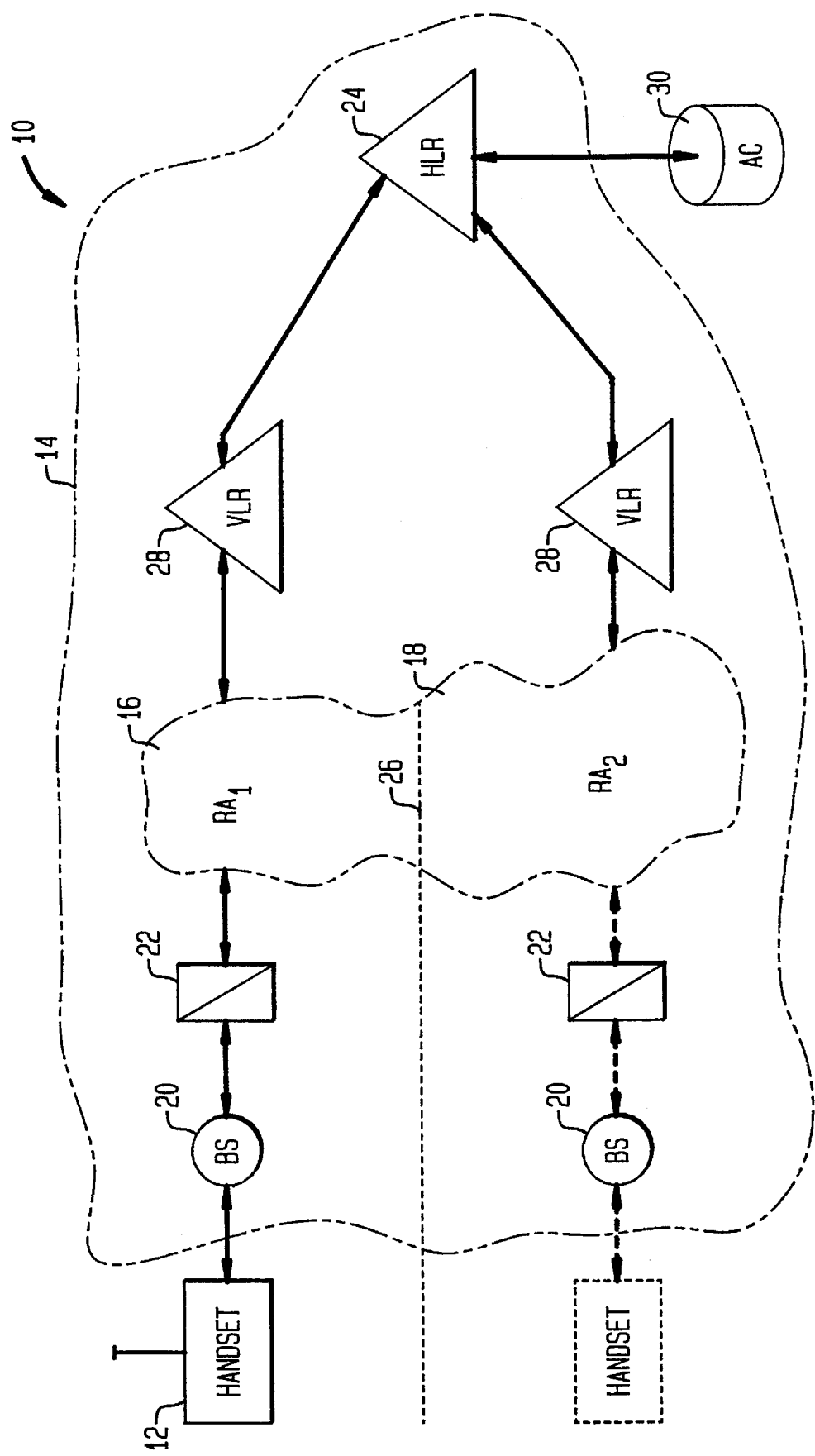
FIG. 1 illustrates a portion of a wireless communication network.
Figure 2:
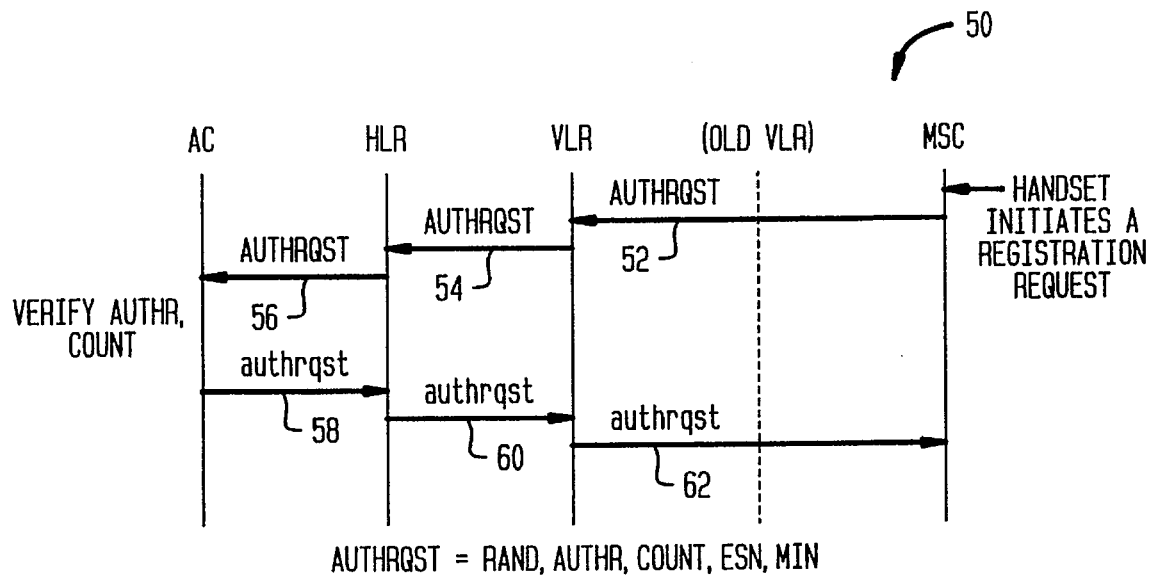
FIG. 2 illustrates a message flow for a registration authentication in the WS Scheme.
Figure 3:
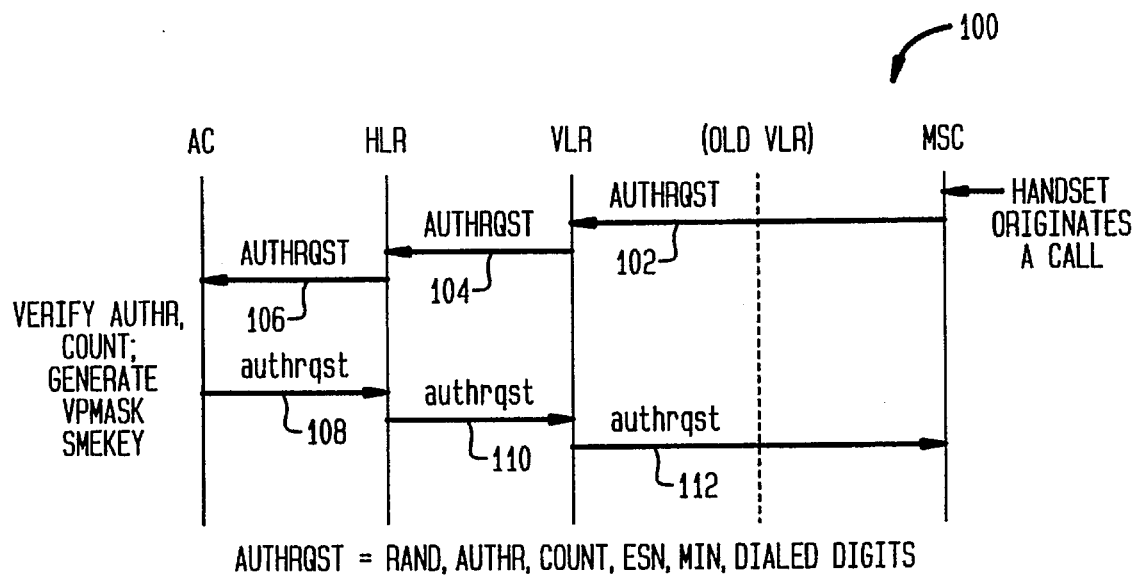
FIG. 3 illustrates a message flow for a call authentication in the WS Scheme.
Figure 4:
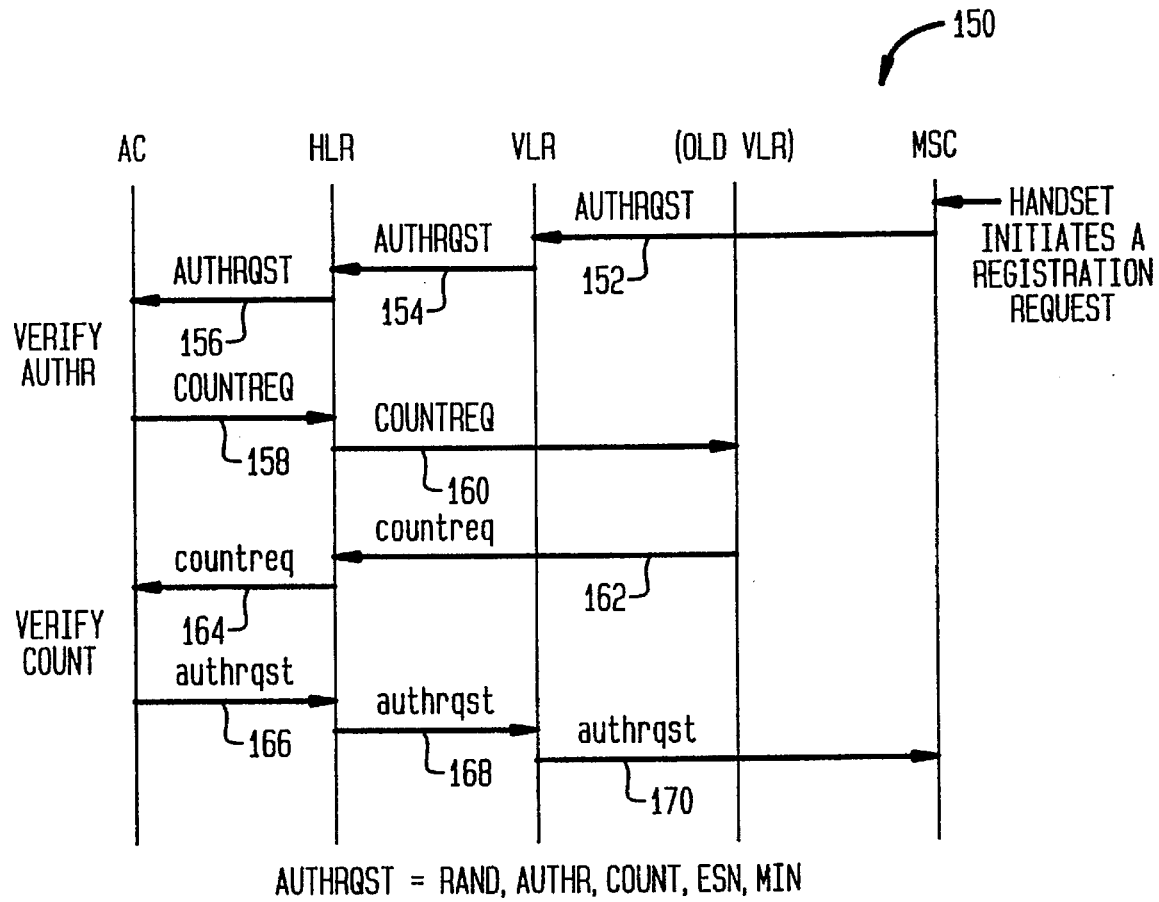
FIG. 4 illustrates a message flow for a registration authentication in the S Scheme.
Figure 5:
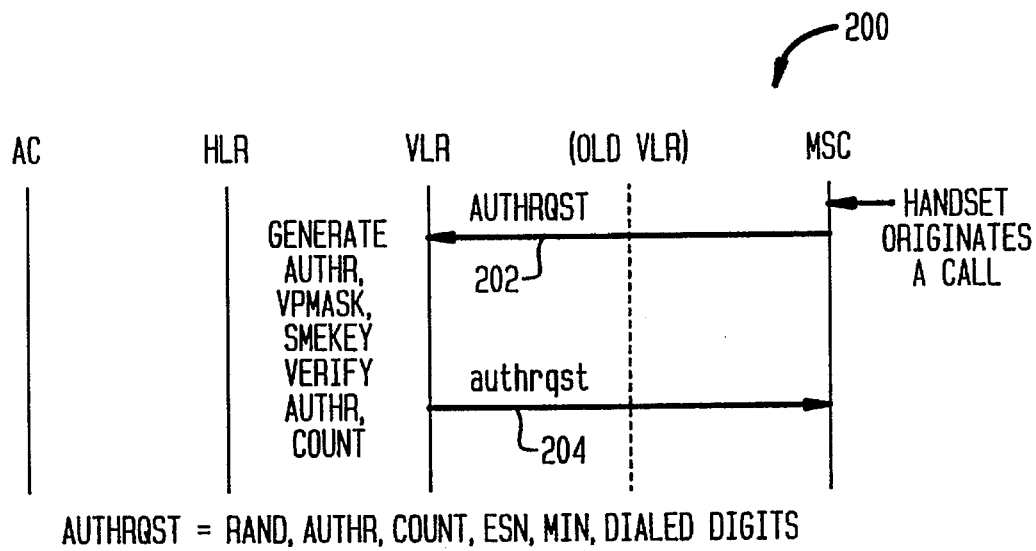
FIG. 5 illustrates a message flow for a call authentication in the S Scheme.

An example of the operation of Method 2 is:

1. A customer registers at a RA, using the WS Scheme, as seen in FIG. 2;
2. When a call originates or terminates at the handset, the authentication is the same as in FIG. 3, except the AS bit in the AC is switched to reflect that the S scheme is being used and the SSD is sent to the VLR in the authrqst message. When the VLR receives the SSD, its AS bit is also switched to reflect that the S scheme is being used. At the time the VLR AS bit is switched, the S Scheme is implemented;
3. All subsequent call originations and terminations during the cycle are authenticated using the S Scheme;
4. The customer travels to a new RA;
5. An AUTHRQST message is sent to the AC;
6. The AS bit in the AC is S, and the message flow is as seen in FIG. 4;
7. After registration, the AS bit in the AC is set to reflect that the WS Scheme is being used;
8. During the cycle, no calls originate or terminate at the handset;

9. The customer travels to a new RA;

10. An AUTHRQST message is sent to the AC; and

11. The bit in the AC is WS, and the message flow is as seen in FIG. 2.

The inventors have determined that the performance of the two methods depend in part on the variance of a customer's residence time in the RAs. If the customer's variance in the residence time is large, Method 2 is more efficient than Method 1 having 2 states (i.e., n=1; n−1 is 0, 2n−1 is 1). However, even where the customer's variance is large, Methods 1 and 2 are about equally efficient where Method 1 has four states (i.e., n=2, n−1 is 1, 2n−1 is 3). If the customer's variance in the residence time is small, Method 1 is more efficient than Method 2 for both 2 and 4 states.

With both methods, no changes to the HLR or handset is needed. The AC may be revised to hold additional Current State bits in Method 1. The AC determines the authentication scheme to be performed. The VLR may be modified to include the AS bits in Method 2.

In conclusion, methods for adaptively switching between the WS and S schemes based on the customer's actual usage are shown. These methods effectively reduce the number of database accesses for registration and call authentication. Thus, the message traffic on a wireless communication network is efficiently managed.

The above described embodiments of the invention are intended to be illustrative only. Numerous alternative embodiments may be devised by those skilled in the art without departing from the spirit and scope of the following claims.

APPENDIX A
Glossary of Acronyms

| | |
|---|---|
| AC | Authentication Center |
| AC bits | Authentication Scheme bits |
| AUTHR | Registration Authentication Result |
| AUTHRQST | Authentication Request to the VLR |
| CAVE | Cellular Authentication and Voice Encryption |
| CMR | Call-to-Mobility Ratio |
| COUNT | Account of significant events initiated by the handset |
| EIA/TIA | Electronic Industry Association/Telecommunications Industry Association |
| ESN | Electronic Serial Number |
| HLR | Home Location Register |
| LOCREQ | Location Request Message |
| MIN | Mobile Identification Number |
| MSC | Mobile Switching Centers |
| PCS | Personal Communications Services |
| PSP | Cellular or Personal Communication Service Provider |
| RA | Registration Area |
| RAND | Random number used for authentication |
| RANDC | Eight most significant bits of RAND |
| SMEKEY | Signal Message Encryption Key |
| SSD | Shared Secret Data |
| VLR | Visitor Location Register |
| VPMASK | Voice Privacy Mask |

We claim:

1. A method for using an automaton having a finite number of successive states for adaptively switching between a first and a second authentication scheme in a mobile communication system providing a plurality of registration areas for a user's handset, said method comprising the steps of:

a. determining a number of calls that are one of a delivered and received at a handset during a time period between movement of the handset from one registration area to another registration area, b. if the number of calls:
      (1) equals a predetermined amount, remaining in the current state of the automaton;
      (2) exceeds the predetermined amount, transitioning the automaton to a higher succeeding state;
      (3) is less than the predetermined amount, transitioning the automaton to a lower preceding state;

c. switching from the first to the second authentication scheme when transitioning to one of the succeeding states of the automaton;

d. switching from the second to the first authentication scheme when transitioning to one of the preceding states of the automaton; and e. not switching authentication schemes at other times.

2. The method of claim 1, wherein the step of determining a number of calls comprises the steps of:

a. maintaining in the handset a count of incoming and outgoing calls during said time period between movement of the handset from one registration area to another registration area; and b. forwarding the count to an authentication center during registration.

3. The method of claim 1, further comprising a. transitioning the automaton into the higher succeeding state when the number of calls exceeds one;

b. leaving the automaton in the same state when the number of calls equals one; and c. transitioning the automaton into the lower preceding state when the number of calls is zero.

4. The method of claim 1, wherein the step of switching from the first to the second authentication scheme is selected to occur when transitioning from state n−1 into state n.

5. The method of claim 4, further comprising selecting a value for n based on mobile communications system customer usage.

6. The method of claim 5, further comprising the step of monitoring mobile communications system customer usage.

7. The method of claim 1, wherein the step of switching from the second to the first authentication scheme is selected to occur when transitioning from state n into state n−1.

8. The method of claim 7, further comprising selecting a value for n based on mobile communications system customer usage.

9. The method of claim 8, further comprising the step of monitoring mobile communications system customer usage.

10. The method of claim 1, further comprising the step of storing a plurality of bits in an authentication center for indicating a current state.

11. The method of claim 10, wherein the step of storing comprises storing enough bits to indicate which of a total number of states the automaton is currently in.

12. A method for adaptively switching between a first and second authentication scheme in a mobile communications system having a plurality of registration areas, said method comprising the steps of:

a. performing the first authentication scheme upon a handset moving into a new registration area;

b. switching to the second authentication scheme if a call is either one of delivered and received at a handset while the handset is in that one registration area; and c. returning to the first authentication scheme upon the handset moving to another registration area.

13. The method of claim 12, further comprising storing a bit in an authentication center and storing a bit in a visiting location register (VLR) for indicating which authentication scheme is to be performed.

14. The method of claim 13, wherein the step of switching further comprises the step of switching the bit in the authentication center and the bit in VLR to indicate that the second authentication scheme is to be performed.

15. The method of claim 14, wherein the step of switching further comprises switching to the second authentication scheme after the bit in the authentication center and the bit in the VLR to indicate that the second authentication scheme is to be performed.

16. The method of claim 12, wherein if the mobile communications system has switched to the second authentication scheme, performing the second authentication scheme to authenticate a next registration before returning to the first authentication scheme.

17. A method for assuring authentication of a mobile customer involved in traffic on a mobile communication system, said method comprising the steps of:

a. providing two authentication schemes;

b. monitoring a customer's system usage; and c. switching between the two authentication schemes performed for the customer based on the customer's system usage.

* * * * *